United States Patent
Comito et al.

(10) Patent No.: US 11,651,501 B2
(45) Date of Patent: May 16, 2023

(54) SYNERGISTIC OBJECT TRACKING AND PATTERN RECOGNITION FOR EVENT REPRESENTATION

(71) Applicant: Disney Enterprises, Inc., Burbank, CA (US)

(72) Inventors: Keith Comito, Seaford, NY (US); Kevin Prince, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 197 days.

(21) Appl. No.: 17/332,648

(22) Filed: May 27, 2021

(65) Prior Publication Data

US 2022/0383519 A1    Dec. 1, 2022

(51) Int. Cl.
G06T 7/246    (2017.01)

(52) U.S. Cl.
CPC .... *G06T 7/251* (2017.01); *G06T 2207/20081* (2013.01); *G06T 2207/30196* (2013.01)

(58) Field of Classification Search
CPC ........... G06T 7/251; G06T 2207/20081; G06T 2207/30196
See application file for complete search history.

(56) References Cited

U.S. PATENT DOCUMENTS

| | | | | |
|---|---|---|---|---|
| 10,300,394 | B1* | 5/2019 | Evans | A63F 13/86 |
| 2018/0012078 | A1* | 1/2018 | Pournaghi | G06T 7/77 |
| 2021/0073524 | A1* | 3/2021 | Boyer | G06V 10/62 |
| 2021/0082128 | A1* | 3/2021 | Okada | G06T 7/248 |

OTHER PUBLICATIONS

Mykhaylo et al, ("Pictorial Structures Revisited: People Detection and Articulated Pose Estimation", Department of Computer Science, TU Darmstadt, IEEE 2009, pp. 1014-1021) (Year: 2009).*
Cao et al, (OpenPose: Realtime Multi-Person 2D Pose Estimation Using Part Affinity Fields, IEEE Transaction on pattern analysis and machine intelligence, vol. 13, No. 1, IEEE 20219, pp. 172-186) (Year: 2019).*
Flip et al, ("Tutorial: Using Deep learning and CNNs to make a Hand Gesture recognition model, p. 1-7, provided by applicant retrieved from internet") (Year: 2019).*
Amazing Ninja Buddy Demo—YouTube.

(Continued)

*Primary Examiner* — Amara Abdi
(74) *Attorney, Agent, or Firm* — Farjami & Farjami LLP

(57) ABSTRACT

A system for performing synergistic object tracking and pattern recognition for event representation includes a computing platform having processing hardware and a system memory storing a software code. The processing hardware is configured to execute the software code to receive event data corresponding to one or more propertie(s) of an object, to generate, using the event data, a location data estimating a location of each of multiple predetermined landmarks of the object, and to predict, using one or both of the event data and the location data, a pattern corresponding to the propertie(s) of the object. The processing hardware is further configured to execute the software code to update, using the predicted pattern, the location data, and to merge the updated location data and the predicted pattern to provide merged data.

16 Claims, 7 Drawing Sheets

(56) References Cited

OTHER PUBLICATIONS

Leonid Pishchulin, Arjun Jain, Mykhaylo Andrilika, Thorsten Thormahlen, Bernt Schiele. Articulated People Detection and Pose Estimation: Reshaping the Future. IEEE Conference on Computer Vision and Pattern Recognition (CVRP), Providence, Rhode Island, Jun. 2012. pp. 1-8.

Hawk-Eye. Wikipedia pp. 1-8.

Kinect. Wikipedia. pp. 1-23.

Zhe Cao, Gines Hidalgo, Tomas Simon, Shih-En Wei, Yaser Sheikh. OpenPose: Realtime Multi-Person 2D Pose Estimation using Part Affinity Fields. IEEE Transactions on Pattern Analysis and Machine Intelligence, vol. XXX, No. XXX, Aug. YYYY. pp. 1-14.

Felipe Borba. Tutorial: Using Deep Learning and CNNs to make a Hand Gesture recognition model. www.towardsdatscience.com. pp. 1-7.

* cited by examiner

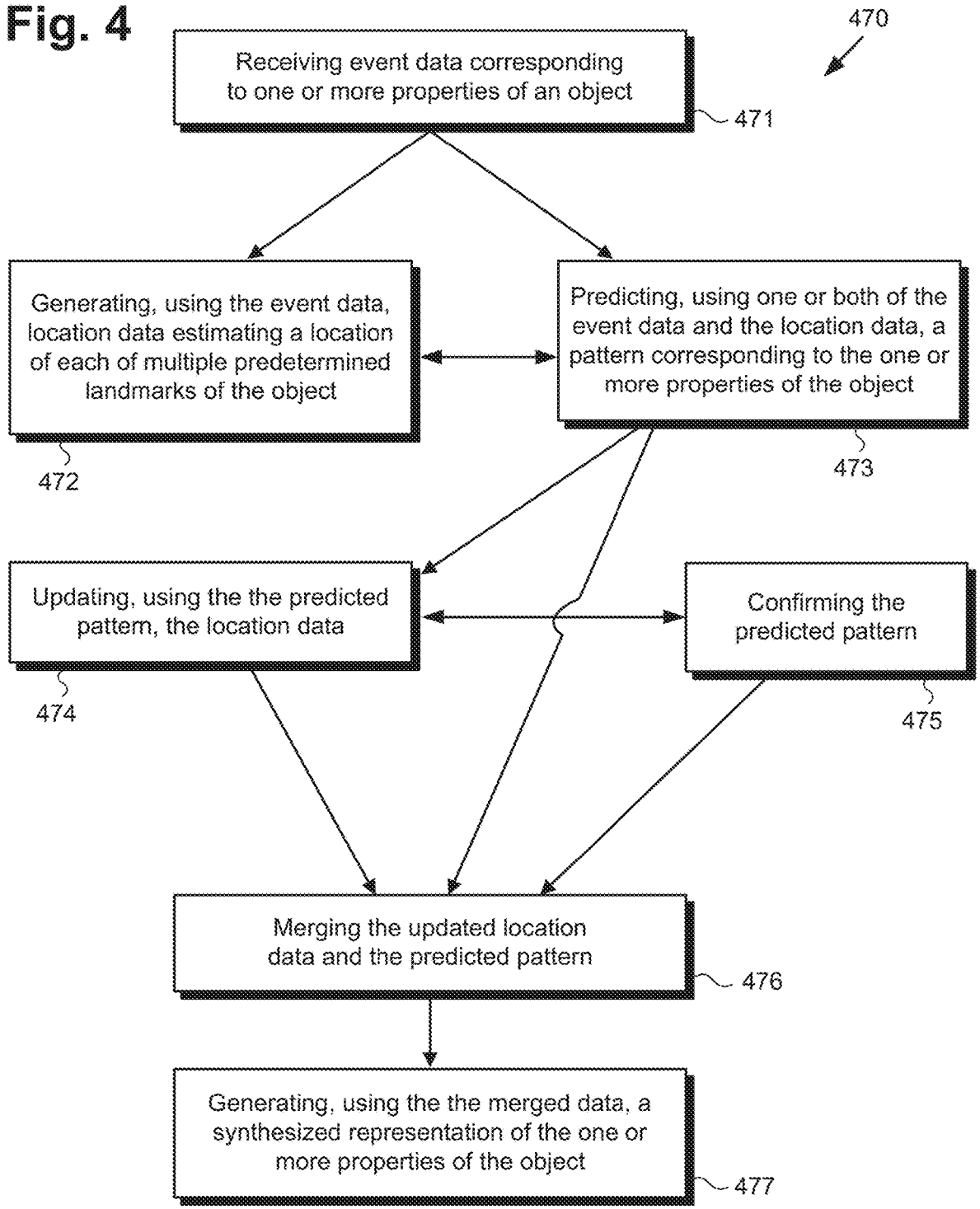

SYNERGISTIC OBJECT TRACKING AND PATTERN RECOGNITION FOR EVENT REPRESENTATION

BACKGROUND

Computer vision systems can perform poorly when a body is moving dynamically or in an atypical manner, as well as when multiple bodies are in close proximity with one another, or are in physical contact. For example, during grappling between competitors in a wrestling, judo, or mixed martial arts competition, a system may be unable to generate accurate three-dimensional (3D) skeletal data when the bodies of the competitors occlude one another. This may significantly limit the ability to identify the full action sequence during a physically interactive event, such as a combat sports event or a dance competition, for example.

BRIEF DESCRIPTION OF THE DRAWINGS

FIG. 4 is a flowchart presenting an exemplary method for use by a system to perform synergistic object tracking and pattern recognition for event representation.

DETAILED DESCRIPTION

Figure 1:
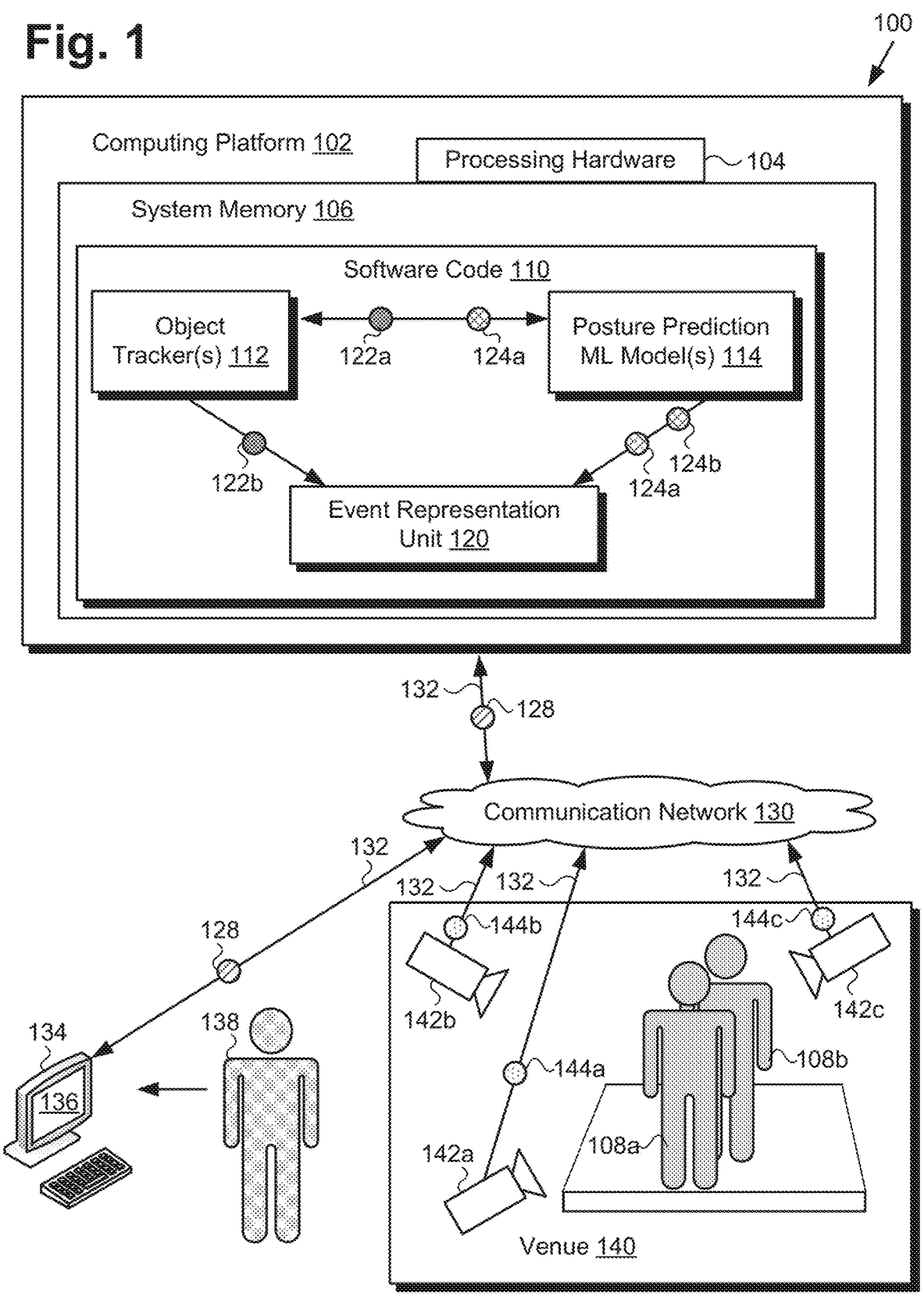
FIG. 1 shows a diagram of an exemplary system for performing synergistic object tracking and pattern recognition for event representation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application is directed to systems and methods for performing synergistic object tracking and pattern recognition for event representation that address and overcome the deficiencies in the conventional art. In various implementations, as discussed in greater detail below, the present novel and inventive concepts advantageously utilize one or more object trackers and one or more trained machine learning models in a synergistic process in which location data generated by the one or more object trackers informs the one or more machine learning models, and where a pattern recognized by the one or more trained machine learning models is used to update the one or more object trackers, thereby enhancing the accuracy of the location data. In some implementations, this synergistic process may be performed iteratively to confirm the recognized pattern, as well as to further refine the location data. As a result, the present solution advantageously enables the accurate identification and reproduction of the respective locations and movements of multiple objects in dynamic motion relative to one another even when one or more of those objects is/are occluded by another. Moreover, the present synergistic object tracking and pattern recognition solution can advantageously be implemented as substantially automated systems and methods.

It is noted that, in the interests of conceptual clarity, the novel and inventive concepts disclosed in the present application are described by reference to a merely exemplary use case in which two human competitors are engaged in a mixed martial arts (MMA) or other combat sport that includes grappling movements that result in one competitor making physical contact with and occluding the body of the other. However, it is emphasized that this particular use case is not to be interpreted as limiting. In other implementations, one or more objects 108a and 108b may correspond to non-human living beings, machines, other inanimate objects, or any combination of human beings, non-human living beings, machines, and other inanimate objects, and may interact in a wide variety of ways other than combat sports.

By way of example, in some implementations, the present techniques may be employed by a scientist, such as a biologist, to accurately track a sequence of events between objects that may move relative to one another but be non-human and invertebrate, such as constituents of slime mold colonies or yeast colonies, for instance. As another example, in some implementations, the present techniques may be employed by a meteorologist to accurately track movements and collisions among weather systems, in order to more accurately predict tornadoes for instance. As yet other examples, the present techniques may be employed by an astronomer or cosmologist to track the movements and interaction of objects within a solar system, or of stars, galaxies, or black holes within the cosmos.

It is further noted that, as used in the present application, the terms "automation," "automated," and "automating" refer to systems and processes that do not require the participation of a human user, such as a human system administrator. Although, in some implementations, a human system administrator may review the performance of the automated systems operating according to the automated processes described herein, that human involvement is optional. Thus, the processes described in the present application may be performed under the control of hardware processing components of the disclosed systems.

Moreover, as used in the present application, the feature "machine learning model" refers to a mathematical model for making future predictions based on patterns learned from samples of data obtained from a set of trusted known matches and known mismatches, known as training data. Various learning algorithms can be used to map correlations between input data and output data. These correlations form the mathematical model that can be used to make future predictions on new input data. Such a predictive model may include one or more logistic regression models, Bayesian models, or neural networks (NNs), for example. In addition, machine learning models may be designed to progressively improve their performance of a specific task.

An NN is a type of machine learning model in which patterns or learned representations of observed data are processed using highly connected computational layers that map the relationship between inputs and outputs. A "deep neural network" (deep NN), in the context of deep learning, may refer to an NN that utilizes multiple hidden layers between input and output layers, which may allow for learning based on features not explicitly defined in raw data. As used in the present application, a feature labeled as an NN refers to a deep neural network. In various implementations, NNs may be utilized to perform image processing or natural-language processing.

FIG. 1 shows a diagram of an exemplary system for performing synergistic object tracking and pattern recognition for event representation, according to one implementation. As shown in FIG. 1, system 100 can include computing platform 102 having processing hardware 104, and system memory 106 implemented as a computer-readable non-transitory storage medium storing software code 110. According to the implementation shown in FIG. 1, software code 110 includes one or more object trackers 112 (hereinafter "object tracker(s) 112") providing location data 122a and updated location data 122b, one or more trained pattern recognition machine learning models 114 (hereinafter "pattern recognition ML model(s) 114") providing predicted pattern 124a and confirmed pattern 124b, and event representation unit 120.

As further shown in FIG. 1, system 100 is implemented within a use environment including communication network 130 providing network communication links 132, venue 140, one or more data capture devices 142a, 142b, 142c (hereinafter "data capture device(s) 142a-142c"), shown as exemplary cameras in FIG. 1, surrounding venue 140 and generating event data 144a, 144b, and 144c, respectively, as input data to system 100. Moreover, FIG. 1 shows one or more objects 108a and 108b, depicted as exemplary human competitors in FIG. 1, which are in motion in venue 140 and may occlude one another from the perspective of one or more of data capture device(s) 142a-142c. It is noted that although venue 140 is depicted as an MMA octagon in FIG. 1, that representation is merely exemplary. In other implementations, venue 140 may correspond to an entire arena or other large entertainment venue, or a much larger space, such as a solar system, galaxy, or galactic cluster in astronomical or cosmological use cases.

Also shown in FIG. 1 is user system 134 having display 136 and utilized by user 138 to receive synthesized representation 128 of the movements of objects 108a and 108b, generated by system 100 based on updated location data 122b and predicted pattern 124a or confirmed pattern 124b. It is noted that, in some implementations, system 100, venue 140, and user system 134 may be remote from one another, and system 100 may be communicatively coupled to user system 134, and to data capture device(s) 142a-142c in venue 140 via communication network 130 and network communication links 132.

Data capture device(s) 142a-142c may be red-green-blue (RGB) still synthesized representation cameras, or video cameras, for example. Thus event data 144a, 144b, and 144c may take the form of digital photographs, sequences of video frames, or audio-video data including audio data in addition to video frames. More generally, however, data capture device(s) may take the form of any devices configured to capture spatial data, sonic data, or spatial and sonic data. According to the exemplary implementation shown in FIG. 1, the event taking place in venue 140 and involving the movement of one or more objects 108a and 108b may be a live event, such as an artistic, sports, or entertainment event, for example. In the exemplary implementation of FIG. 1, system 100 is configured to provide synthesized representation 128 in real-time with respect to the performance of the live event.

Although the present application refers to software code 110 as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic system memory, such as dynamic random access system memory (dynamic RAM), while non-volatile system memory may include optical, magnetic, or electrostatic storage devices. Common forms of computer-readable non-transitory storage media include, for example, optical discs, RAM, programmable read-only system memory (PROM), erasable PROM (EPROM), and FLASH system memory.

Moreover, although FIG. 1 depicts software code 110 as being stored in its entirety in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and system memory resources within system 100. Processing hardware 104 of system 100 may include one or more of a machine-learning framework central controller, one or more central processing units (CPUs), one or more graphics processing units (GPUs), one or more tensor processing units (TPUs), field programmable gate arrays (FPGAs), custom hardware for machine-learning training or inferencing, and an application programming interface (API) server, for example.

According to the implementation shown by FIG. 1, user 138 may utilize user system 134 to interact with system 100 over communication network 130. In one such implementation, system 100 may correspond to one or more web servers, accessible over a packet-switched network such as the Internet, for example. Alternatively, system 100 may correspond to one or more computer servers supporting a local area network (LAN), a wide area network (WAN), or included in another type of limited distribution or private network.

User system 134 and communication network 130 enable user 138 to receive synthesized representation 128 of various properties of one or more objects 108a and 108b in venue 140 from computing platform 102. Synthesized representation 128 may be a collection of data that allows user 138 of user system 134 to more accurately perceive, recognize, and classify, for example, the sequence of events in an interaction among one or more objects 108a and 108b. That data may include movements by one or more objects 108a and 108b, their locations, body positions that do not involve movement, such as poses or stances for example, as well as colors, sounds, and metadata.

Although user system 134 is shown as a desktop computer in FIG. 1, that representation is provided merely as an example. More generally, user system 134 may be any suitable mobile or stationary computing device or system that implements data processing capabilities sufficient to provide a user interface, support connections to communication network 130, and implement the functionality ascribed to user system 134 herein. For example, in some implementations, user system 134 may take the form of a laptop computer, tablet computer, smartphone, or game console, for example. However, in other implementations user system 134 may be a "dumb terminal" peripheral component of system 100 that enables user 138 to provide inputs via a keyboard or other input device, as well as to view video content via display 136. In those implementations, user system 134 and display 136 may be controlled by processing hardware 104 of system 100.

With respect to display 136 of user system 134, display 136 may be physically integrated with user system 134 or may be communicatively coupled to but physically separate from user system 134. For example, where user system 134 is implemented as a smartphone, laptop computer, or tablet computer, display 136 will typically be integrated with user system 134. By contrast, where user system 134 is implemented as a desktop computer, display 136 may take the form of a monitor separate from user system 134 in the form of a computer tower. Moreover, display 136 may be implemented as a liquid crystal display (LCD), a light-emitting diode (LED) display, an organic light-emitting diode (OLED) display, a quantum dot (QD) display, or a display using any other suitable display technology that performs a physical transformation of signals to light.

Figure 2A:
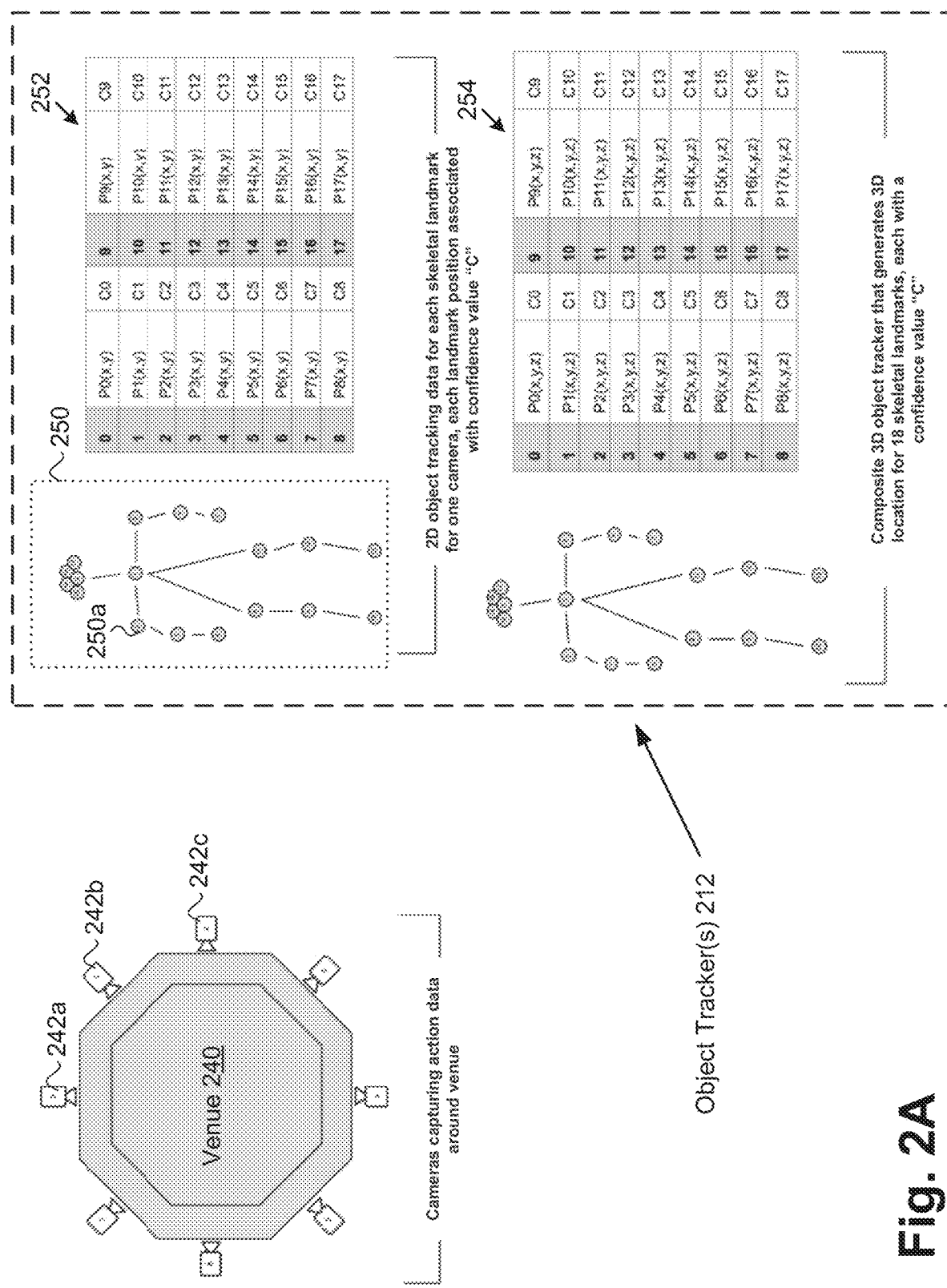
FIG. 2A shows a diagram of an exemplary object tracker suitable for use in the system of FIG. 1, according to one implementation.

The functionality of system 100 and software code 110 are further described below by reference to FIGS. 2A, 2B, and 2C. Referring first to FIG. 2A, FIG. 2A shows a diagram of exemplary one or more object trackers 212 (hereinafter "object tracker(s) 212") suitable for use in system 100 of FIG. 1, according to one implementation. In addition, FIG. 2A shows exemplary venue 240 shown as an MMA octagon, one or more data capture devices shown as exemplary cameras surrounding or otherwise situated in venue 240, which are represented by exemplary data capture devices 242a, 242b, and 242c (hereinafter "data capture device(s) 242a-242c"), and multiple landmarks 250 of each of one or more objects 108a and 108b, in FIG. 1, (landmarks represented by exemplary landmark 250a in FIG. 2A). Venue 240, data capture device(s) 242a-242c and object tracker(s) 212 correspond respectively in general to venue 140, data capture devices(s) 142a-142c and object tracker(s) 112, in FIG. 1. Consequently, venue 240, data capture device(s) 242a-242c and object tracker(s) 212 may share any of the characteristics attributed to respective venue 140, data capture device(s) 142a-142c, and object tracker(s) 112 by the present disclosure, and vice versa.

As noted above, the exemplary implementation shown in FIG. 2A, as well as those shown in FIGS. 2B, 2C, and 3 discussed below, are described by reference to an exemplary use case in which one or more objects 108a and 108b correspond to two human competitors in an MMA or other combat sport that includes grappling movements in which the body of one competitor makes physical contact with and occludes the body of the other. However, it is reiterated that this particular use case is merely provided in the interests of conceptual clarity, and is not to be interpreted as limiting. In other implementations, one or more objects 108a and 108b may correspond to non-human living beings, machines, other inanimate objects, or any combination of human beings, non-human living beings, machines, weather events, and other inanimate objects, such as solar system objects, or stars, galaxies, or black holes, as also noted above.

Referring to FIGS. 1 and 2A in combination, event data 144a, 144b, and 144c may be received from data capture device(s) 142a-142c/242a-242c positioned in or around venue 140/240. It is noted that although FIG. 2A depicts eight fixed position cameras evenly spaced around venue 140/240, that representation is merely exemplary. In other implementations, data capture device(s) 142a-142c/242a-242c may include as few as one camera, more than one but less than eight cameras, or more than eight cameras. Moreover, in various implementations, data capture device(s) 142a-142c/242a-242c may include one or more fixed position data capture devices, one or more dynamically repositionable data capture device(s), or a combination of fixed position and dynamically repositionable data capture device(s).

In some implementations, two-dimensional (2D) object tracking may be applied to each data capture device, generating data in the form of 2D position data 252 for each data capture device for each of landmarks 250 that is output some predetermined or dynamically determined number of times per second. It is noted that due to the particular use case depicted in FIG. 2A, landmarks 250 may take the form of multiple predetermined skeletal landmarks of each combat sport competitor, such as eighteen predetermined skeletal landmarks, for example, or any other number of such predetermined landmarks.

Each of data capture device(s) 142a-142c/242a-242c may be calibrated to compensate for factors such as lens distortion and its three-dimensional (3D) positioning, for example. For each landmark, object tracker(s) 112/212 may also provide a confidence value, which may be adjusted, e.g., reduced, based on factors such as occlusions or ambiguous event data. These confidence values may also be adjusted by additional input knowledge, such as the predicted pattern output by pattern recognition ML model(s) 114, which in the present use case may be knowledge of what type of grapple the competitors are engaged in. Position data 252 may be combined from all data capture device(s) 142a-142c/242a-242c using triangulation techniques, taking into consideration the confidence values of each 2D positional estimate to generate 3D skeletal tracking data 254. According to the exemplary implementation shown in FIG. 2A, skeletal tracking data 254 takes the form of the 3D location of each of landmarks 250 relative to the center of venue 140/240, e.g., the ground level center of the combat octagon or ring, and is output some predetermined or dynamically determined number of times per second. For each 3D landmark location, there may also be a confidence value that can by adjusted, e.g., reduced, based on factors such as low confidence in the underlying 2D position data 252, ambiguous triangulation results of the underlying 2D position data, or both. These confidence values for the 3D landmark locations may also be adjusted by additional input knowledge, such as knowledge of what type of grapple the competitors are engaged in, provided by the predicted pattern output by pattern recognition ML model(s) 114. Finally, object tracker(s) 112/212 may provide location data 122a estimating the 3D location of each of each of the multiple predetermined landmarks of each of one or more objects 108a and 108b.

It is noted that although, in some implementations, system 100 may receive event data 144a, 144b, and 144c from data capture device(s) 142a-142c/242a-242c as 2D camera data that is transformed by object tracker(s) 112/212 to 3D, as described above, that use case is merely exemplary. In other use cases, event data 144*a*, 144*b*, and 144*c* may be 3D image data, and object tracker(s) 112/212 may generate skeletal tracking data 254 and location data 122*a* based on that received 3D image data, rather than on 2D position data 252. For example, rather than the eight cameras depicted in FIG. 2A, data capture device(s) 142*a*-142*c*/242*a*-242*c* may take the form of fewer curved cameras, such as four for example, each providing event data in the form of partial 3D image data. Alternatively, in other use cases, data capture devices may be implemented as sonar detectors or infrared detectors.

Figure 2B:
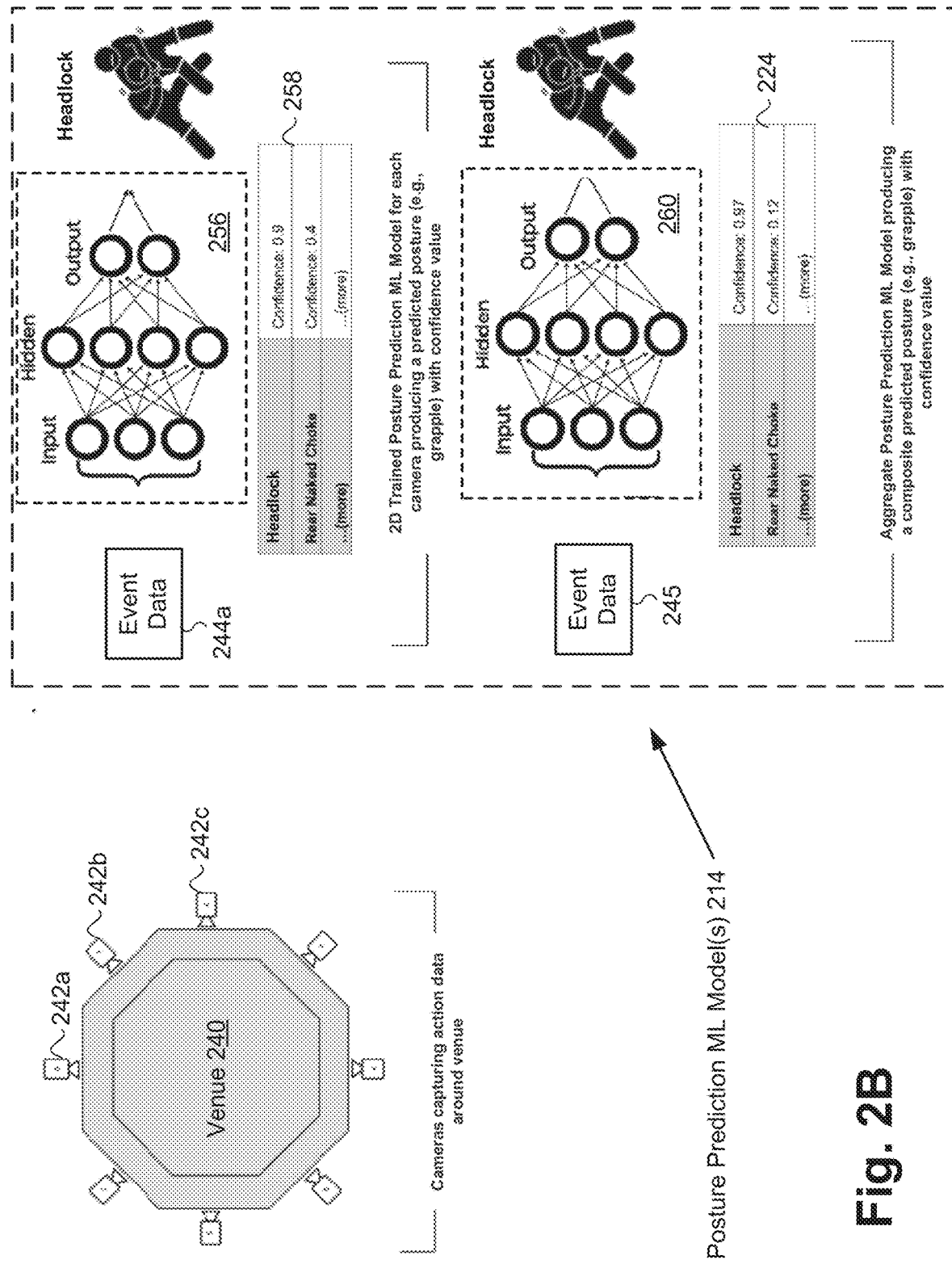
FIG. 2B shows a diagram of an exemplary pattern recognition machine learning model suitable for use in the system of FIG. 1, according to one implementation.

FIG. 2B shows a diagram of exemplary one or more pattern recognition ML models 214 (hereinafter "pattern recognition ML model(s) 214") suitable for use in system 100 of FIG. 1, according to one implementation. In addition, FIG. 2B shows venue 240 and data capture device(s) 242*a*-242*c*. As shown in FIG. 2B, pattern recognition ML model(s) 214 may include one or more trained 2D pattern recognition ML models 256, as well as trained aggregate pattern recognition ML model 260. Also shown in FIG. 2B is exemplary event data 244*a* provided by data capture device 242*a*, output array 258 of 2D pattern recognition ML model 256, predicted pattern 224*a*, aggregate event data 244, and confirmed pattern 224*b*. Pattern recognition ML model(s) 214, event data 244*a*, predicted pattern 224*a*, and confirmed pattern 224*b* correspond respectively in general to pattern recognition ML model(s) 114, event data 144*a*, predicted pattern 124*a*, and confirmed pattern 124*b* in FIG. 1. Thus, pattern recognition ML model(s) 214, predicted posture 224*a*, and confirmed pattern 224*b* may share any of the characteristics attributed to prediction ML model(s) 114, predicted pattern 124*a*, and confirmed pattern 124*b* by the present disclosure, and vice versa. Moreover, aggregate event data 245, in FIG. 2B, corresponds in general to the aggregate of event data 144*a*, 144*b*, and 144*c*, in FIG. 1.

Referring to FIGS. 1 and 2B in combination, each of event data 144*a*/244*a*, 144*b*, and 144*c* received from a respective one of data capture device(s) 142*a*-142*c*/242*a*-242*c* may be processed by a respective one 2D pattern recognition ML model 256 trained to predict a pattern corresponding to one or more properties, such as locations and movements for example, of one or more objects 108*a* and 108*b* from among a predetermined and finite set of patterns on which pattern recognition ML model(s) 114/214 has been trained. For example, 2D pattern recognition ML model 256 may be trained to recognize specific entanglements between two human bodies when viewed from a side-view vantage point. Output array 258 from 2D pattern recognition ML model 256 may take the form of an array of named postures or entanglements (e.g., grapple type), each with a predicted confidence value, arranged in order from highest confidence to lowest confidence, and may be output some predetermined or dynamically determined number of times per second.

The data produced by trained 2D pattern recognition ML model 256 may be combined for all data capture device(s) 242*a*-242*c* using triangulation techniques, taking into consideration the confidence value for each predicted pattern, and with a weighting of each data capture device based prediction being tunable based on additional input knowledge, such as body orientation, and may be processed using trained aggregate pattern recognition ML model 260. For example, in the exemplary use case of MMA competitors facing off in a north-south direction, north-south positioned data capture devices among data capture device(s) 142*a*-142*c*/242*a*-242*c* may be weighted more heavily for analyzing front/back grapple views, while orthogonally positioned east-west data capture devices may be weighted more heavily for analyzing side grapple views. According to the exemplary implementation shown in FIG. 2B, predicted pattern 124*a*/224*a* in the form of a predicted grappling posture is the output by pattern recognition ML model(s) 114/214 every predetermined or dynamically determined number of times per second.

Figure 2C:
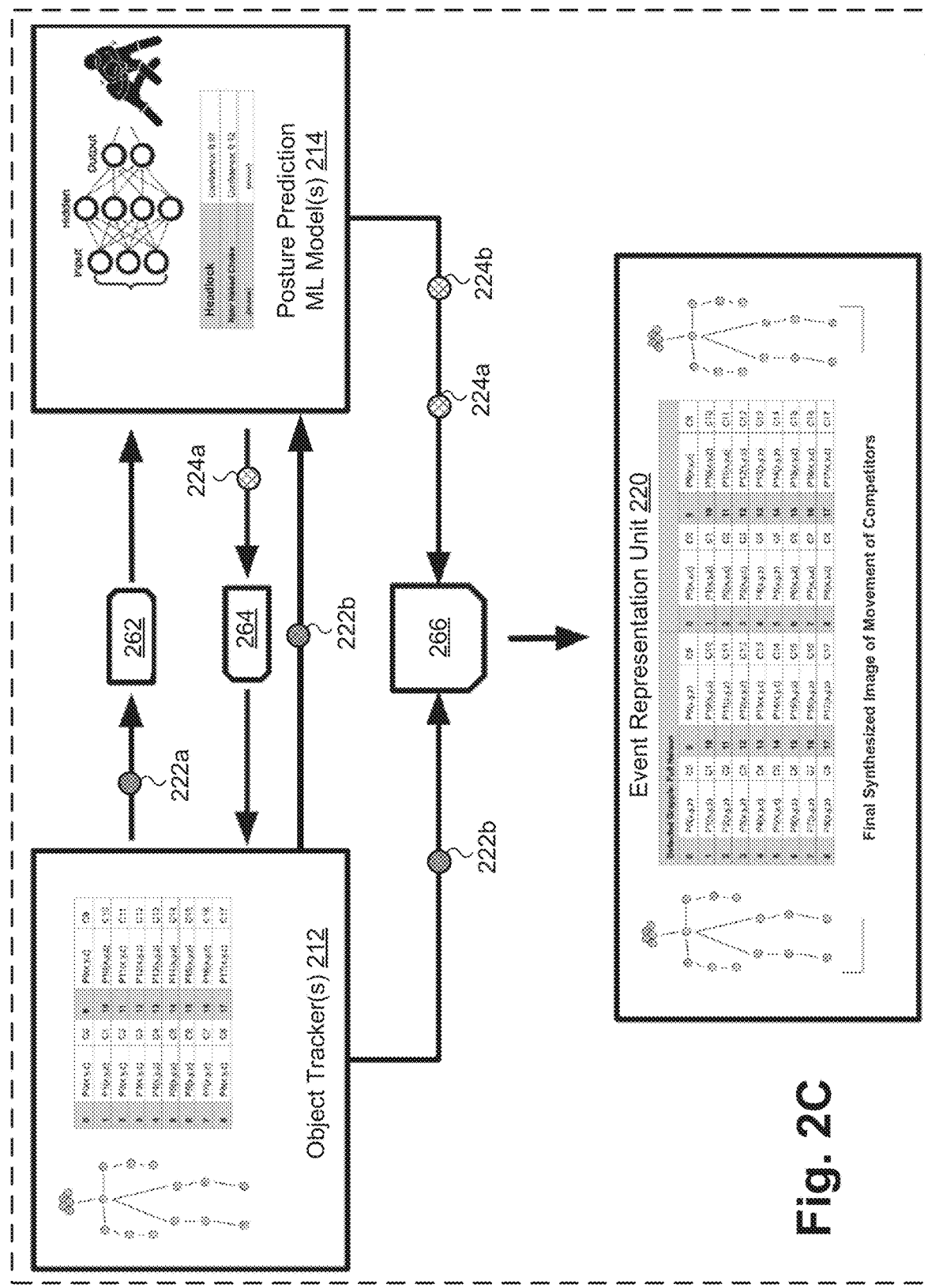
FIG. 2C shows a diagram of selected features included in a software code utilized in the system of FIG. 1, according to one implementation.

FIG. 2C shows a diagram of selected features included in software code 110 utilized in system 100 of FIG. 1, according to one implementation. In addition to the features shown and described above by reference to FIGS. 1, 2A, and 2B, FIG. 2C shows location data 222*a*, updated location data 222*b*, and event representation unit 220. Also shown in FIG. 2C are domain logic blocks 262, 264, and 266. Location data 222*a*, updated location data 222*b*, and event representation unit 220 correspond respectively in general to location data 122*a*, updated location data 122*b*, and event representation unit 120, in FIG. 1. That is to say, location data 222*a*, updated location data 222*b*, and event representation unit 220 may share any of the characteristics attributed to respective location data 122*a*, updated location data 122*b*, and event representation unit 120 by the present disclosure, and vice versa.

Referring to FIGS. 1 and 2C in combination, according to the exemplary implementation shown in FIG. 2C, object tracker(s) 112/212 transfers its output, i.e., location data 122*a*/222*a*, to trained pattern recognition ML model(s) 114/214 via domain logic block 262. As used herein, "domain logic" may refer to configurable logic that may pertain to a particular domain or problem space, such as domain-specific rules or algorithms. Domain logic block 262 may filter location data 122*a*/222*a* based on the confidence values included in location data 122*a*/222*a*, for example, to filter out location data having an associated confidence value below a predetermined threshold. Alternatively, or in addition, domain logic block 262 may normalize location data 122*a*/222*a*. It is noted that although domain logic block 262 is shown as a discrete unit in FIG. 2C, that representation is merely exemplary. In other implementations, domain logic block 262 may be integrated with object tracker(s) 112/212, may be integrated with trained pattern recognition ML model(s) 114/214, or may be distributed between object tracker(s) 112/212 and trained pattern recognition ML model(s) 114/214.

Trained pattern recognition ML model(s) 114/214 may modify its own output based on location data 122*a*/222*a* received from object tracker(s) 112/212. Trained pattern recognition ML model(s) 114/214 transfers its output, i.e., predicted pattern 124*a*/224*a*, to object tracker(s) 112/212 via domain logic block 264. Domain logic block 264 may filter predicted pattern 124*a*/224*a* based on the confidence values included in predicted pattern 124*a*/224*a*, for example, to filter out predicted patterns having an associated confidence value below a predetermined threshold. Alternatively, or in addition, domain logic block 264 may normalize predicted pattern 124*a*/224*a*. It is noted that although domain logic block 264 is shown as a discrete unit in FIG. 2C, that representation is merely exemplary. In other implementations, domain logic block 264 may be integrated with trained pattern recognition ML model(s) 114/214, may be integrated with object tracker(s) 112/212, or may be distributed between trained pattern recognition ML model(s) 114/214 and object tracker(s) 112/212.

Object tracker(s) 112/212 may modify its own output based on predicted pattern 124*a*/224*a* received from trained pattern recognition ML model(s) 114/214, and may provide updated location data 122*b*/222*b* as an output to event representation unit 120/220 via domain logic block 266.

Moreover, in some implementations, pattern recognition ML model(s) may receive updated location data 122*b*/222*b* from object tracker(s) 112/212 and may use updated location data 122*b*/222*b* to update and confirm predicted pattern 124*a*/224*a* as confirmed pattern 124*b*/224*b*. In addition, and as shown by FIG. 2C, trained pattern recognition ML model(s) 114/214 may provide predicted pattern 124*a*/224*a* or confirmed pattern 124*b*/224*b* as an output to event representation unit 120/220 via domain logic block 266. Domain logic block 266 may filter one or both of updated location data 122*b*/222*b* and predicted pattern 124*a*/224*a* or confirmed pattern 124*b*/224*b* based on the confidence values included in updated location data 122*b*/222*b* and predicted pattern 124*a*/224*a* or confirmed pattern 124*b*/224*b*, for example, to filter out location data and patterns having an associated confidence value below a predetermined threshold. Alternatively, or in addition, domain logic block 266 may normalize updated location data 122*b*/222*b* and predicted pattern 124*a*/224*a* or confirmed pattern 124*b*/224*b*. It is noted that although domain logic block 266 is shown as a discrete unit in FIG. 2C, that representation is merely exemplary. In other implementations, domain logic block 266 may be integrated with event representation unit 120/220, or may be distributed among object tracker(s) 112/212, trained pattern recognition ML model(s) 114/214, and event representation unit 120/220.

Event representation unit 120/220 may merge updated location data 122*b*/222*b* and predicted pattern 124*a*/224*a* or confirmed pattern 124*b*/224*b* to provide merged data as an output some predetermined or dynamically determined number of times per second. For example, in one implementation the merged data may be provided as an output of event representation unit 120/220 approximately nineteen times per second. In some implementations, the merged data may be output for use in various downstream processes, such as force estimation, or data visualizations, for example. However, in other implementations, event representation unit 120/220 may use the merged data to generate synthesized representation 128 of the movement by one or more objects 108*a* and 108*b*, such as a synthesized image of that movement for example.

Figure 2D:
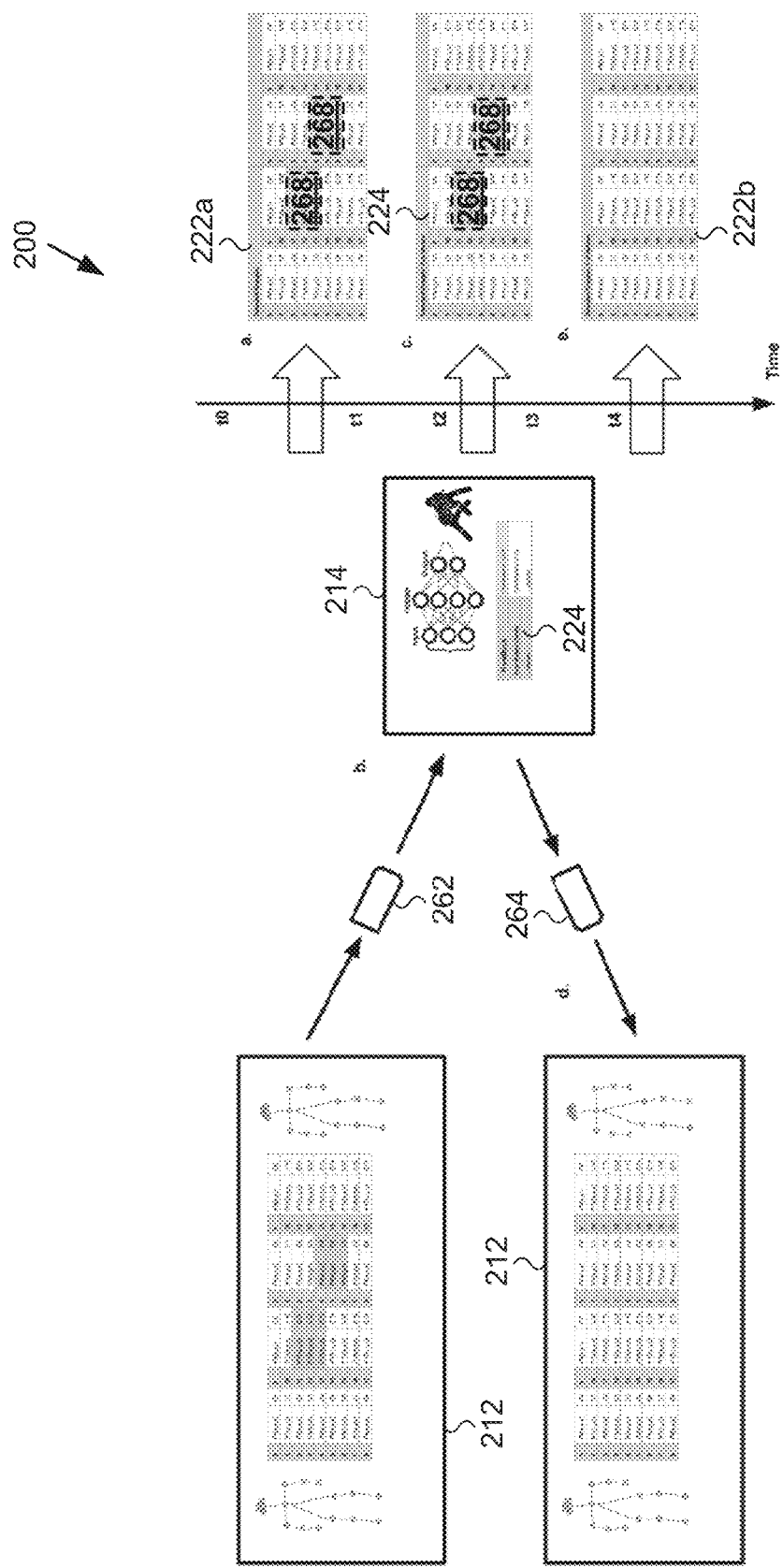
FIG. 2D shows a diagram of synergistic interaction between the exemplary object tracker shown in FIG. 2A and the exemplary pattern recognition machine learning model shown in FIG. 2B, according to one implementation.

Continuing to FIG. 2D, FIG. 2D shows diagram 200 of synergistic interaction between exemplary object tracker(s) 112/212 and exemplary trained pattern recognition ML model(s) 114/214, according to one implementation. In addition to the features shown and described above by reference to FIGS. 1, 2A, 2B, and 2C, FIG. 2D shows low confidence value data 268 included among location data 122*a*/222*a*. As shown by FIG. 1 and FIG. 2D, system 100 is capable of providing more complete and accurate object tracking and pattern recognition than conventional solutions due, at least in part, to the synergistic and iterative cooperation between object tracker(s) 112/212 and trained pattern recognition ML model(s) 114/214.

According to the exemplary use case shown in FIG. 2D, at time t0 trained pattern recognition ML model(s) 114/214 do not recognize any predetermined patterns by either of the two combating competitors corresponding to one or more objects 108*a* and 108*b*. At t0, object tracker(s) 112/212 are outputting location data 122*a*/222*a* including low confidence value data 268 for the left leg of one competitor, e.g., object 108*a*, as well as low confidence value data 268 for both arms of the other competitor, e.g., object 108*b*. Despite the presence of low confidence value data 268 in location data 122*a*/222*a*, domain logic block 262 is able to use location data 122*a*/222*a* to determine the general orientation of both competitors' bodies at time t1, as well as the data capture devices that are orthogonal to their shared axis (i.e., those of data capture device(s) 142*a*-142*c*/242*a*-242*c* that would yield the best side-view vantage points of the competitors, and to transfer that information to that/those pattern recognition ML model(s) among pattern recognition ML model(s) 114/214 that have been trained on side view grapple training data.

The information transferred to trained pattern recognition ML model(s) 114/214 enable trained pattern recognition ML model(s) 114/214 to adjust the weighting applied to data capture device(s) 142*a*-142*c*/242*a*-242*c*, which in turn enables trained pattern recognition ML model(s) 114/214 to identify predicted pattern 124*a*/224*a* to be a chokehold grapple with high confidence at time t2. Predicted pattern 124*a*/224*a* is provided as an output from trained pattern recognition ML model(s) 114/214 to object tracker(s) 112/212 via domain logic block 264 at time t3. As a result, object tracker(s) 112/212 are able to generate updated location data 122*b*/222*b* for the bodies of both competitors in a chokehold grapple at time t4.

It is noted that the synergy between object tracker(s) 112/212 and trained pattern recognition ML model(s) 114/214 advantageously enables object tracker(s) 112/212 to provide updated location data 122*b*/222*b* in which low confidence value data 268 has been replaced with high confidence value location data. It is further noted that, in some implementations, updated location data 122*b*/222*b* may be transferred from object tracker(s) 112/212 to trained pattern recognition ML model(s) 114/214 via domain logic block 262, and may be used by trained pattern recognition ML model(s) 114/214 to provide confirmed pattern 124*b*/224*b*. It is also noted that although the description of FIG. 2D provided above refers to times t0, t1, t2, t3, and t4 as discrete time intervals, the synergistic and iterative exchange of data between object tracker(s) 112/212 and trained pattern recognition ML model(s) 114/214 may occur substantially continuously, such as on a frame-by-frame basis, for example, when event data 144*a*, 144*b*, and 144*c* is in the form of video.

It is noted that although the iterative exchange of data between object tracker(s) 112/212 and trained pattern recognition ML model(s) 114/214 may occur on a frame-by-frame basis, in some implementations the exchange of data may be performed based on a timing component that spans multiple frames. That is to say, pattern recognition ML model(s) 114/214 may not be trained to recognize a pattern, such as a chokehold grapple posture, instantly, but rather as a fluid sequence of movements. This may result when pattern recognition ML model(s) is/are trained on short clips of video data as opposed to static images. For example there are many judo throws or wrestling grapples that look the same at certain instants in time, and are only distinguishable from one another on the basis of a sequence of movements.

Figure 3:
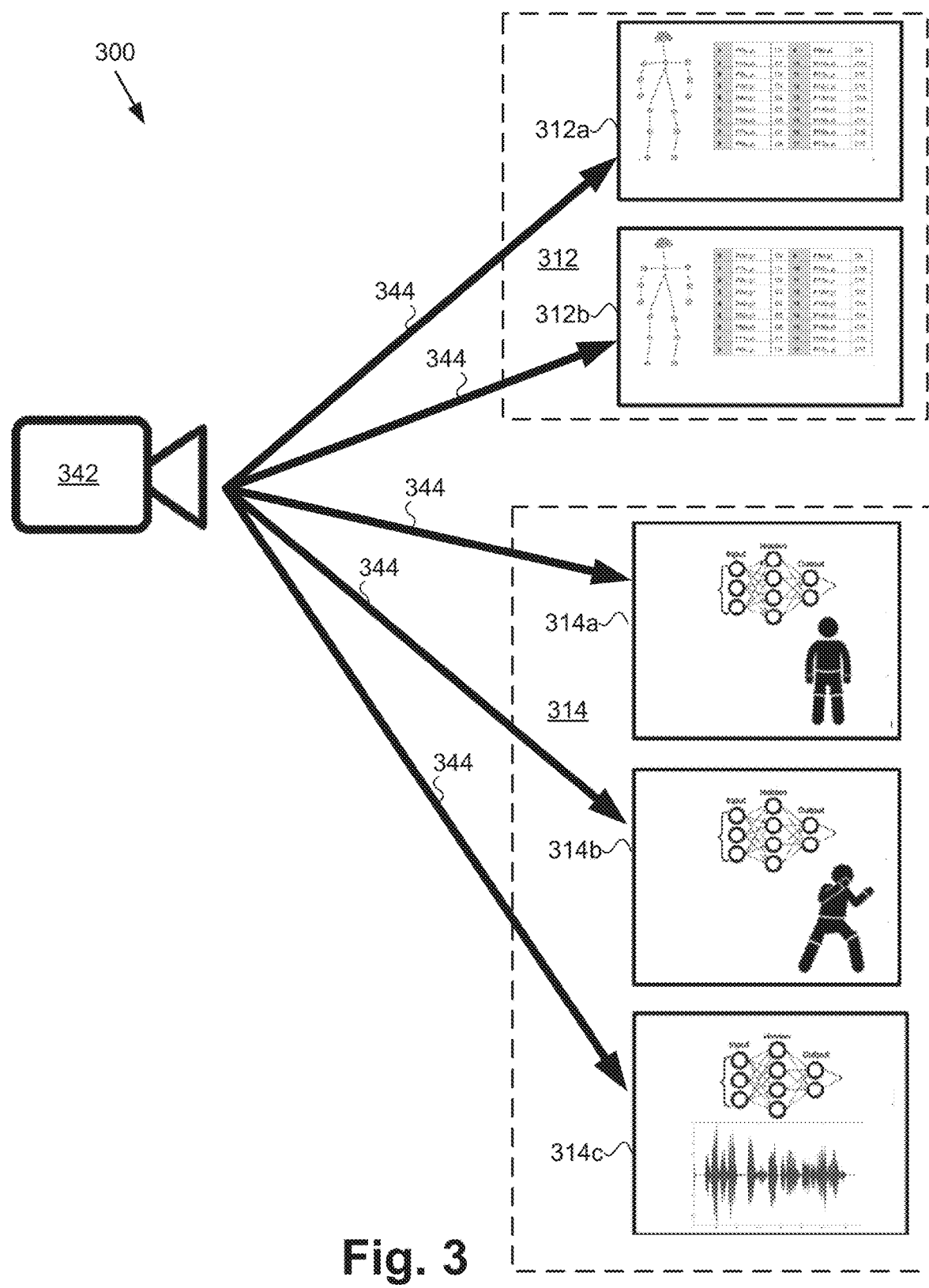
FIG. 3 shows an exemplary diagram depicting use of multiple object trackers and multiple pattern recognition machine learning models to perform synergistic object tracking and pattern recognition, according to one implementation.

FIG. 3 shows exemplary diagram 300 depicting use of multiple object trackers and multiple trained pattern recognition ML models to perform synergistic object tracking and pattern recognition, according to one implementation. Diagram 300 shows object trackers 312 including multiple object trackers 312*a* and 312*b*, as well as trained pattern recognition ML models 314 including multiple trained pattern recognition ML models 314*a*, 314*b*, and 314*c*. Also shown in FIG. 3 is exemplary data capture device 342 shown as a merely exemplary camera providing event data 344 to each object tracker and trained posture predicting ML model.

Object trackers 312 and trained pattern recognition ML models 314 correspond respectively in general to object tracker(s) 112/212 and trained pattern recognition ML model(s) 114/214 shown variously in FIGS. 1, 2A, 2B, 2C, and 2D. Thus, object trackers 312 and trained pattern recognition ML models 314 may share any of the characteristics attributed to respective object tracker(s) 112/212 and trained pattern recognition ML model(s) 114/214 by the present disclosure, and vice versa. In addition, data capture device 342 and event data 344 correspond respectively to any one of data capture device(s) 142a-142c/242a-242c and any one instance of event data 144a/244a, 144b, or 144c, shown variously in FIGS. 1, 2A, and 2B. Consequently, data capture device 342 and event data 344 may share any of the characteristics attributed to data capture device(s) 142a-142c/242a-242c and event data 144a/244a, 144b, or 144c by the present disclosure, and vice versa. Moreover, according to the exemplary implementation represented by FIG. 3, each of data capture device(s) 142a-142c/242a-242c may feed multiple object trackers 312 and multiple trained pattern recognition ML model(s) 314.

It is noted that although FIG. 3 depicts object trackers 312 as including two object trackers, and depicts trained pattern recognition ML models 314 as including three trained pattern recognition ML models, that representation is merely exemplary. In other implementations, a single object tracker may receive event data 344 from data capture device 342, while more than three pattern recognition ML models may receive event data 344 from data capture device 342. In other implementations, more than two object trackers may receive event data 344 from data capture device 342, while less than three trained pattern recognition ML models receives event data 344 from data capture device 342. Furthermore, in some implementations, as depicted in FIG. 3, object trackers 312 may include multiple object trackers and trained pattern recognition ML models may include multiple trained pattern recognition ML models that differ in number from the number of object trackers.

Once again considering the exemplary MMA competition use case described above by reference to FIGS. 2A, 2B, 2C, and 2D (hereinafter "FIGS. 2A-2D"), in implementations in which each data capture device 342 feeds multiple object trackers 312a and 312b, one of object trackers 312a or 312b may be used to generate location data for the landmarks of one of the MMA competitors while the other of object trackers 312a or 312b is used to generate location data for landmarks of the other MMA competitor. Alternatively, one of object trackers 312a or 312b may be used to generate location data for upper body landmarks of both MMA competitors while the other of object trackers 312a or 312b is used to generate location data for landmarks on the legs of both competitors.

Moreover, in implementations in which each data capture device 342 feeds multiple trained pattern recognition ML models 314a, 314b, and 314c, one of trained pattern recognition ML models 314a or 314b may be used to predict grapples while the other of trained pattern recognition ML models 314a or 314b is used to predict striking gestures, such as punches and kicks. Alternatively, or in addition, and as shown in FIG. 3, in some implementations one of trained pattern recognition ML models 314a or 314b, e.g., pattern recognition ML model 314a, may be trained to recognize front/back views, while the other of trained pattern recognition ML models 314a or 314b, e.g., pattern recognition ML model 314b, may be trained to recognize side views. In addition, in some implementations, as shown in FIG. 3, trained pattern recognition ML model 314c may be used to interpret audio included in event data 344.

The functionality of software code 110 will be further described by reference to FIG. 4 in combination with FIG. 1. FIG. 4 shows flowchart 470 presenting an exemplary method for use by a system to perform synergistic object tracking and pattern recognition. With respect to the method outlined in FIG. 4, it is noted that certain details and features have been left out of flowchart 470 in order not to obscure the discussion of the inventive features in the present application. It is further noted that each of the actions described by flowchart 470 may be performed by software code 110, executed by processing hardware 104 of computing platform 102, using the approaches discussed above by reference to FIGS. 1, 2A-2D, and 3.

Referring to FIG. 4 in combination with FIGS. 1, 2A-2D, and 3 flowchart 470 includes receiving event data 144a/144b/144c/344 corresponding to one or more properties of an object (i.e., object 108a or 108b) action (471), and generating, using event data 144a/144b/144c/344, location data 122a/222a estimating the location of each of multiple predetermined landmarks 250 of the object (action 472). As discussed above, event data 144a/144b/144c/344 may take the form of digital photographs or video, video including audio, audio without video, sonar data, or infrared sensor data to name a few examples. As further discussed above, action 472 may be performed by software code 110, executed by processing hardware 104 of computing platform 102, and using one or more object tracker(s) 112/212/312.

Flowchart 470 further includes predicting, using one or both of event data 144a/144b/144c/344 or location data 122a/222a, a pattern (i.e., predicted pattern 124a/224a) corresponding to the one or more properties of the object (action 473). As discussed above, action 473 may be performed by software code 110, executed by processing hardware 104 of computing platform 102, and using one or more trained pattern recognition ML model(s) 114/214/314. As further discussed above, in some implementations, predicted pattern 124a/224a may be a posture or sequence of motions, such as a grapple or judo throw for example, included in a predetermined and finite set of postures on which pattern recognition ML model(s) 114/214/314 has been trained. It is noted that although action 473 follows action 472 in flowchart 470, that representation is merely by way of example. In other implementations, action 473 may precede action 472, while in other implementations actions 472 and 473 may be performed in parallel, i.e., substantially concurrently.

Flowchart 470 further includes updating, using predicted pattern 124a/224a, location data 122a/222a to provide updated location data 122b/222b (action 474), and in some implementations, flowchart 470 may also include confirming predicted pattern 124a/224a to provide confirmed pattern 124b/224b (action 475). In some implementations, action 475 may be performed by software code 110, executed by processing hardware 104, and using one or more trained pattern recognition ML model(s) 114/214/314 and updated location data 122b/222b. In some implementations in which event data 144a/144b/144c/344 received in action 471 includes audio data, action 475 may be performed by software code 110, executed by processing hardware 104, and using the audio data. By way of example, in the MMA competition use case described above, one of two competitors (e.g., object 108a) may be in physical contact with and occlude the other object (e.g., 108b) in the video provided by event data 144a/144b/144c/344. Nevertheless, a predicted pattern 124a/224a "chokehold grapple" may result from action 473. That predicted pattern may be confirmed based on audio data included in event data 144*a*/144*b*/144*c*/344 in which the MMA announcer declares that one competitor has the other in a chokehold.

Flowchart 470 further includes merging updated location data 122*b*/222*b* and predicted posture 124*a*/224*a* to provide merged data (action 476) and, in some implementations, may further include generating, using the merged data, synthesized representation 128 of the one or more properties of the object (action 477), including its movement, location, and posture, for example. It is noted that in some implementations of the method outlined by flowchart 470, action 475 may be omitted, and action 474 may be followed by action 476, or by actions 476 and 477 in sequence. Moreover, in some implementations, multiple iterations of action 471, 472, 473, and 474 (hereinafter "action 471-474") or action 471-474 and 475 may be performed prior to action 476. With respect to the method outlined by flowchart 470, it is noted that actions 471-474 and 476, or actions 471-474, 475, and 476, or actions 471-474, 476, and 477, or actions 471-474, 475, 476, and 477, may be performed in an automated process from which human involvement can be omitted.

Thus, the present application discloses systems and methods for performing synergistic object tracking and pattern recognition for event representation that overcome the deficiencies in the conventional art. As described above, in various implementations, the present novel and inventive concepts advantageously utilize one or more object trackers and one or more trained machine learning models in a synergistic process in which location data generated by the one or more object trackers informs the one or more machine learning models, and where a pattern recognized by the one or more trained machine learning models is used to update the one or more object trackers, thereby enhancing the accuracy of the location data. In some implementations, this synergistic process may be performed iteratively to confirm the recognized pattern, as well as to further refine the location data. As a result, the present solution advantageously enables the accurate identification and reproduction of the respective movements, locations, and postures of multiple objects in dynamic motion relative to one another even when one or more of those objects is occluded by another, is in physical contact with another object, or is occluded by and in physical contact with another object.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a processing hardware and a system memory storing a software code;
   the processing hardware configured to execute the software code to:
   receive event data corresponding to one or more properties of an object;
   generate, using the event data, a location data estimating a location of each of a plurality of predetermined landmarks of the object;
   predict, using at least one of the event data or the location data, a pattern corresponding to the one or more properties of the object;
   update, using the predicted pattern, the location data to provide an updated location data;
   confirm, using the updated location data, the predicted pattern corresponding to the movement of the object;
   merge the updated location data and the predicted pattern to provide merged data; and
   generate, using the merged data, a synthesized representation of the one or more properties of the object.

2. The system of claim 1, further comprising:
   one or more trained machine learning models configured to predict the pattern corresponding to the one or more properties of the object.

3. The system of claim 1, further comprising:
   one or more object trackers configured to be used by the software code to generate the location data.

4. The system of claim 1, wherein the event data comprises video, and wherein the one or more properties of the object causes another object to be occluded in the video.

5. The system of claim 4, wherein the object comprises a human being, and wherein the one or more properties of the object correspond to a physical interaction with the another object.

6. The system of claim 5, wherein the another object comprises a human being, and wherein the physical interaction includes physical contact of the object with the another object.

7. The system of claim 1, wherein the event data comprises audio, and wherein the processing hardware is further configured to execute the software code to:
   confirm, using the audio, the predicted pattern corresponding to the one or more properties of the object.

8. The system of claim 1, wherein the predicted pattern is one of a plurality of predetermined postures.

9. A method for use by a system including a computing platform having a processing hardware, and a system memory storing a software code, the method comprising:
   receiving, by the software code executed by the processing hardware, event data corresponding to one or more properties of an object;
   generating, by the software code executed by the processing hardware using the event data, a location data estimating a location of each of a plurality of predetermined landmarks of the object;
   predicting, by the software code executed by the processing hardware using at least one of the event data or the location data, a pattern corresponding to the one or more properties of the object;
   updating, by the software code executed by the processing hardware using the predicted posture, the location data to provide an updated location data;
   confirming, by the software code executed by the processing hardware using the updated location data, the predicted pattern corresponding to the movement of the object;
   merging, by the software code executed by the processing hardware, the updated location data and the predicted posture to provide merged data; and
   generating, by the software code executed by the processing hardware using the merged data, a synthesized representation of the one or more properties of the object.

10. The method of claim 9, wherein the system further comprises one or more trained machine learning models, wherein the software code uses the one or more trained machine learning models to predict the pattern corresponding to the one or more properties of the object.

11. The method of claim 9, wherein the system further comprises one or more object trackers, wherein the software code uses the one or more object trackers to generate the location data.

12. The method of claim 9, wherein the event data comprises video, and wherein one or more properties of the object causes another object to be occluded in the video.

13. The method of claim 12, wherein the object comprises a human being, and wherein the one or more properties of the object corresponds to a physical interaction with the another object.

14. The method of claim 13, wherein the another object comprises a human being, and wherein the physical interaction includes physical contact of the object with the another object.

15. The method of claim 9, wherein the event data comprises audio, and wherein the method further comprises:
    confirming, by the software code executed by the processing hardware and using the audio, the predicted pattern corresponding to the one or more properties of the object.

16. The method of claim 9, wherein the predicted pattern corresponding to the one or more properties of the object is one of a plurality of predetermined postures.

* * * * *